United States Patent [19]

Shackelford et al.

[11] Patent Number: 5,265,206
[45] Date of Patent: Nov. 23, 1993

[54] SYSTEM AND METHOD FOR IMPLEMENTING A MESSENGER AND OBJECT MANAGER IN AN OBJECT ORIENTED PROGRAMMING ENVIRONMENT

[75] Inventors: Floyd W. Shackelford, Buford, Ga.; Cynthia A. Ross, Boynton Beach, Fla.; William L. Rich, Stone Mountain, Ga.; Robert L. Abraham, Marietta, Ga.; John R. Tiller, Jr., Peachtree City, Ga.; Richard E. Moore, Marietta, Ga.; Richard S. Briggs, Jr., Bloomingdale, Ill.

[73] Assignee: International Business Machines Corporation, Armonk, N.Y.

[21] Appl. No.: 602,442

[22] Filed: Oct. 23, 1990

[51] Int. Cl.⁵ .............................................. G06F 13/00
[52] U.S. Cl. ............................. 395/200; 364/DIG. 1; 364/280; 364/284
[58] Field of Search ............ 364/DIG. 1 MS File, 364/DIG. 2 MS File; 395/200, 325, 375, 600, 650, 700, 725, 800

[56] References Cited

U.S. PATENT DOCUMENTS

| | | | |
|---|---|---|---|
| 4,558,413 | 12/1985 | Schmidt et al. | 395/DIG. 1 |
| 4,621,321 | 11/1986 | Boebert et al. | 395/DIG. 1 |
| 4,821,220 | 4/1989 | Duisberg | 364/578 |
| 4,864,497 | 9/1989 | Lowry et al. | 395/DIG. 1 |
| 4,885,717 | 12/1989 | Beck et al. | 395/DIG. 2 |

OTHER PUBLICATIONS

"Object Management System", by R. B. Bennett, IBM Technical Disclosure Bulletin, vol. 18, No. 5, Oct., 1975, pp. 1356, 1359, and 1360.
"Object Creation Mechanism for Object Management System," by R. B. Bennett et al., IBM Technical Disclosure Bulletin, vol. 18, No. 5, Oct. 1975, pp. 1361-1364.

*Primary Examiner*—Robert B. Harrell
*Attorney, Agent, or Firm*—Sterne, Kessler, Goldstein & Fox

[57] ABSTRACT

A system for implementing a messenger and object manager in an object oriented programming environment on a data processor containing a memory, in which objects are categorized into one or more classes which define methods of the objects categorized therein, and in which messages are sent by the data processor to objects to perform actions thereon. The system includes a message call processing procedure operating on the data processor for processing message calls to instances, including a method resolution segment for calling a loaded classes table to determine whether the class corresponding to a method of the instance is loaded, where the method corresponds to the action requested by the message. If the corresponding class is not loaded in main memory, then the system dynamically loads the class. A data resolution segment calls an object management table to resolve an indirection pointer which points to the address of a data frame corresponding to the instance.

12 Claims, 18 Drawing Sheets

| | |
|---|---|
| FEATURE 1 SECURITY CHECK FLAG | TRUE |
| FEATURE 2 SECURITY CHECK FLAG | FALSE |
| ⋮ | |
| FEATURE N SECURITY CHECK FLAG | ????? |

900

| CLASS A'S ANCESTOR LIST ||
|---|---|
| Ancestor | Offsets |
| E | 0 |
| F | 2 |
| B | 0 |
| G | 9 |
| H | 12 |
| I | 14 |
| C | 9 |
| D | 17 |
| A | 0 |

| CLASS C'S ANCESTOR LIST ||
|---|---|
| Ancestor | Offsets |
| G | 0 |
| H | 3 |
| I | 5 |
| C | 0 |

| FEATURE TABLE | | | | |
|---|---|---|---|---|
| FEATURE | FEATURE NUMBER | ANCESTOR NUMBER | ANCESTOR FEATURE NUMBER | FEATURE ADDRESS |
| 1 | | | | |
| 2 | | | | |
| ↓ | | | | |
| n | | | | |

Figure 12

A's FEATURE TABLE

| FEATURE | FEATURE NUMBER | ANCESTOR INDEX | ANCESTOR FEATURE NUMBER | FEATURE ADDRESS |
|---|---|---|---|---|
| A-1 | 7 | - | - | XF |
| A-2 | 9 | 2 | 9 | X00 |
| B-3 | 4 | - | - | X1E |
| A-2 | 11 | - | - | X00 |
| B-3 | 4 | 4 | 4 | X1E |
| B-4 | 2 | 2 | 2 | X00 |
| D-1 | 5 | 5 | 53 | X00 |

B's FEATURE TABLE

| FEATURE | FEATURE NUMBER | ANCESTOR INDEX | ANCESTOR FEATURE NUMBER | FEATURE ADDRESS |
|---|---|---|---|---|
| B-1 | 7 | - | - | XF6 |
| B-3 | 4 | - | - | XA1 |
| B-2 | 9 | - | - | XC0 |
| B-4 | 2 | 0 | 2 | X00 |
| D-1 | 5 | - | - | XD1 |

C's FEATURE TABLE

| FEATURE | FEATURE NUMBER | ANCESTOR INDEX | ANCESTOR FEATURE NUMBER | FEATURE ADDRESS |
|---|---|---|---|---|
| C-1 | 2 | - | - | XFF |

D's FEATURE TABLE

| FEATURE | FEATURE NUMBER | ANCESTOR INDEX | ANCESTOR FEATURE NUMBER | FEATURE ADDRESS |
|---|---|---|---|---|
| D-1 | 5 | - | - | X1F3 |

Figure 13A

CLASS A's ANCESTOR LIST

| ANCESTOR | INDEX |
|---|---|
| C | 0 |
| D | 1 |
| B | 2 |

CLASS B's ANCESTOR LIST

| ANCESTOR | INDEX |
|---|---|
| C | 0 |
| D | 1 |
| B | 2 |
| A | 3 |

CLASS C's ANCESTOR LIST

| ANCESTOR | INDEX |
|---|---|
| C | 0 |

CLASS D's ANCESTOR LIST

| ANCESTOR | INDEX |
|---|---|
| D | 0 |

Figure 13B

SYSTEM AND METHOD FOR IMPLEMENTING A MESSENGER AND OBJECT MANAGER IN AN OBJECT ORIENTED PROGRAMMING ENVIRONMENT

BACKGROUND OF THE INVENTION

1. Field of the Invention

The field of the invention relates generally to an object oriented programming environment. More particularly, the invention relates to a Messenger and Object Manager system to implement an object oriented environment.

2. Related Art

This section provides a brief description of object oriented computing system concepts which are pertinent to the present invention. A more detailed description of the concepts discussed in this section is found in a number of references, including *Object-Oriented Systems Analysis* by Sally Shlaer and Stephen J. Mellor (Yourdon Press Computing Series, 1988), *Object Oriented Design With Applications* by Grady Booch (The Benjamin/Cummings Publishing Company, 1990) and *Object Oriented Software Construction* by B. Meyer, (Prentice Hall, 1988).

In object oriented programming systems (OOPS), "messages" are sent to "objects". There are two parts to a message. The parts are: (1) Object (2) Action. The object of the message simply identifies that piece of data which comprises a specific object, called an "instance". The action specifies what to do with that data.

In order to develop an OOPS environment, it is necessary to have what is known as an Object Manager and Messenger. The Object Manager's (OM) responsibility is to manage and keep track of all objects, whether stored in volatile memory (RAM) or in non-volatile persistent memory (called DASD or Direct Access Storage Device). The Messenger's responsibility is to see that every message is sent to the correct method code and that this method operates upon the correct object data.

In conventional programming, emphasis is put on methods to be conducted on data sets. In OOPS one is concerned with real world objects. These real world objects have attributes and actions to be performed on the attributes. An object is a data structure containing information about something of interest to the system and its users. Objects having similar characteristics and common behavior are instance objects of the class. In summary, instance objects contain information about things in the system and class objects contain information about instance objects. Class objects contain information that is global to all instances of a single class.

SUMMARY OF THE INVENTION

The present invention is a system for implementing a Messenger and Object Manager in an object oriented programming environment on a data processor containing a memory, in which a plurality of objects are categorized into one or more classes which define methods of the objects categorized therein, and in which messages are sent by the data processor to at least one object to perform at least one action upon the object. The system comprises a message call processing procedure operating on the data processor for processing a message call to an instance, including a method resolution segment for calling a loaded classes table to determine whether the class corresponding to a method of the instance is loaded. The method corresponds to the action requested by the message. If the corresponding class is not loaded in main memory, then the system dynamically loads the class. A data resolution segment calls an object management table to resolve an indirection pointer which points to the address of a data frame corresponding to the instance.

The message call processing means further includes: an ancestor list that identifies for each class all corresponding ancestor classes; a feature table that identifies each method available in each class and whether each method is inherited from a specific ancestor class; and a security table containing security authorizations of each method within each class. The object management table also includes means for administering the indirection pointer to a location in the memory for each action specified by the message call.

The Messenger and Object Manager of the present invention provides the following features and advantages: polymorphism—the OOPS ability to resolve which method to apply to an object, depending upon the hierarchy of inherited objects; data encapsulation; late binding of data until the actual run of the message occurs; multiple inheritance of features and attributes; feature rename or redefinition of inherited features, thus forcing the interface to maintain consistency to implement polymorphism; and export control for isolation of internal routines from the outside world.

BRIEF DESCRIPTION OF THE DRAWINGS

The invention will be better understood if reference is made to the accompanying drawings in which:

FIG. 12 shows a generalized feature table in connection with the present invention.

FIGS. 13A and 13B show a sample feature table and ancestor list, respectively, in connection with the present invention.

DETAILED DESCRIPTION OF THE PREFERRED EMBODIMENTS

The purpose of the Object Manager is multi-faceted. Its primary responsibility is to provide messaging support to facilitate the object oriented programming paradigm of Product Manager: Engineering Management Edition (PM:EME), which is a commercially software product available from International Business Machines. OOPS is the architecture used to implement PM:EME. Additionally, the Object Manager transparently provides data access indirection, memory management, a unit of work environment, and automatic materialization and dematerialization of persistent objects from the data base.

The Object Manager (OM) comprises four main components: a Messenger, a Class Table (CT), a Loaded Classes Table (LCT), and an Object Management Table (OMT). Each component is described in detail below.

The preferred embodiment of the Unit of Work Manager is covered in co-pending, commonly owned application Ser. No. 425,607, filed Oct. 23, 1989, titled: Unit of Work for Preserving Data Integrity of a Database, the disclosure of which in its entirety is incorporated herein by reference.

Figure 1:
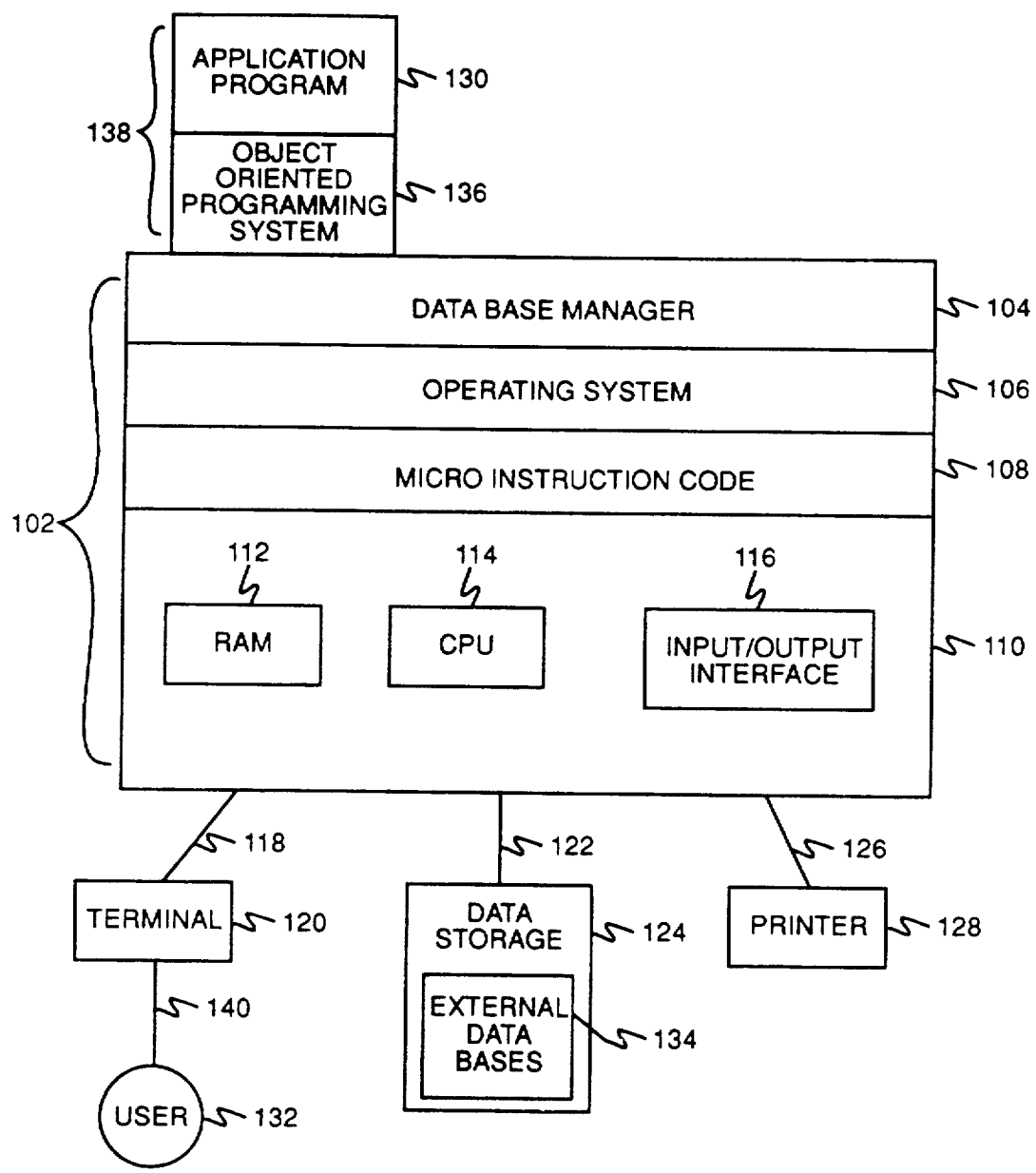
FIG. 1 shows an OOPS environment in connection with the present invention.

As shown in FIG. 1, the present invention is a computer program 138 which operates on a computer platform 102. The computer program 138 includes an application program 130 and an object oriented programming system 136.

The computer platform 102 includes hardware units 110 including a central processing unit (CPU) 114, a random access memory (RAM) 112, and an input/output interface 116. The RAM 112 is also called a main memory 112.

The computer platform 102 also includes microinstruction code 108, an operating system 106, and a database manager 104. Various peripheral components may be connected to the computer platform 102, such as a terminal 120, a data storage device 124, and a printing device 128. The data storage device or secondary storage 124 may include hard disks and tape drives. The data storage device 124 represents non volatile storage. External databases 134 are stored on the secondary storage 124. In OOPS the operating system uses virtual memory and manages all paging.

Users 132 interact with the computer platform 102 and the computer program 138 via terminal 120.

In a preferred embodiment of the present invention, the computer platform 102 includes a computer having an IBM System 370 architecture. The operating system 106 which runs thereon is an IBM Multiple Virtual Storage (MVS). The database manager 104 is an IBM DB2, which is a relational database manager. Also, the computer program 138 is preferably written in Intermediate C, which is an object oriented dialect of the C computer programming language. Intermediate C is similar to the C++ computer programming language.

Figure 2:
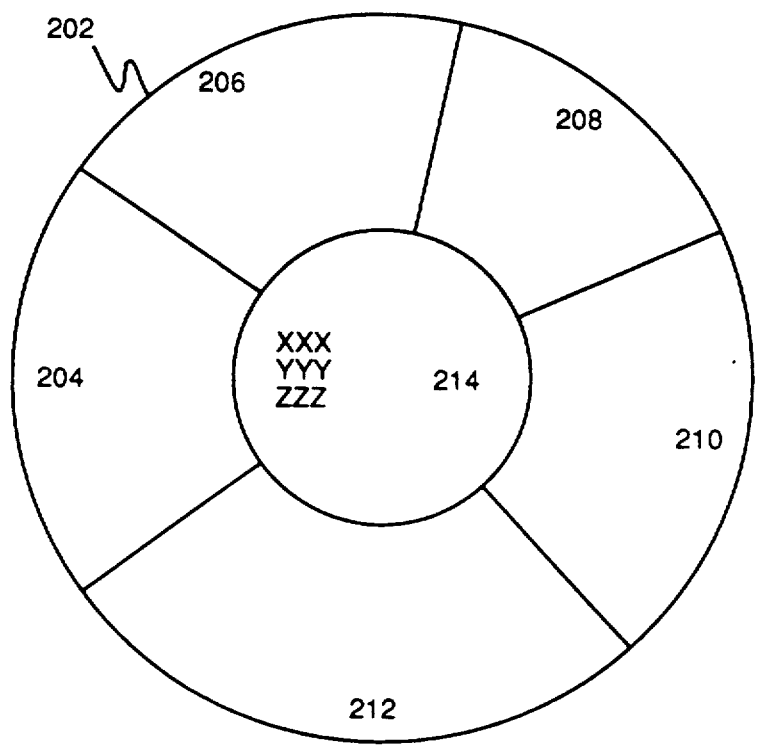
FIG. 2 shows a graphical representation of an object in connection with the present invention.

FIG. 2 presents a graphical representation of an object 202. The object 202 contains data 214 (also called attributes) and the actions 204, 206, 208, 210, 212 (also called methods). Generally, methods are categorized as functions or procedures. A function is a type of code that will return a result. Normally a function tends not to modify the state of the parameters given.

As shown in FIG. 2, the object 202 is modeled by a doughnut, with the data 214 being in the center of the doughnut. The data 214 represent various attributes of the object 202. The color of one's eyes, date of birth, name, etc., could be attributes of an object representing a person. Around the outside, or the bread part of the doughnut, are the actions (also called methods) 204, 206, 208, 210, 212 to be performed on the data 214.

OOPS categorize objects into classes. Thus, a class defines the features of its objects. A feature is either a method or an attribute. Features can be either exported, i.e., other methods can call them, or features can be non-exported, i.e., they can not be called except by a within-class method. An instance is a specific object with the features defined by its class.

An object has an arbitrarily unique value when using the examples of doughnuts representing objects of the same type of class. The bread part of the doughnuts which represent the actions or functions of the instance objects are arranged identically for each of the objects in the particular class. Similarly, the data in the inside of the doughnuts is identically structured. Therefore, if the two objects are of the same type, the structures are identical except for the actual data or attribute values.

The functions or actions to be performed on the data totally surround the data and in a sense encapsulate the data. Conventionally, the only programming that is allowed to know anything about the data are the functions or the routines in the bread part of the doughnut. This form of data encapsulation is not exclusive to object oriented programming. The basic idea behind data encapsulation is to minimize the number of system pieces that one must understand to form of a particular set of data attributes.

The function(s) encapsulating a specific object is/are the only elements that know or care what the encapsulated data looks like. The functions isolate the encapsulated data from other parts of the system. Therefore one ends up with ultimate flexibility over time to change the data of an object in any desired fashion. Optimally, one is capable of modifying the system as technologies change, by merely changing the data. Alternatively, the product is portable. It can be moved from a relational data base to a hierarchical data base, or to a PC which has no particular data base at all. A user is only required to change pieces of the internal data. An object only needs to be concerned about how it represents the data for which it is responsible. This is fundamental to an object oriented environment, since it is a large, portable software product.

The Object Manager and Messenger for an OOPS is essentially language independent and extends the programming language on which it is built. Regardless of the language, the system would communicate or call to the Messenger to get to a specific object and perform a desired action on that object, using specified parameters.

OOPS are message based systems. Objects invoke or ask other objects to perform an action. As noted above, a message is an object/action pair with the following the format: OBJ@ACTION; the left side of the message operator identifies a specific "object", and the right side specifies what "action" is to be performed on, or with the object. The "@" symbol represents a message operator in intermediate C. If the action is a functional procedure which requires parameters, the syntax of the message object and action will also be followed by a parameter or string of parameters offset by parentheses and separated by commas.

The message is essentially a call. Conceptually, it is a call to a part of the object or into the enabling system called a Messenger. A Messenger's job is to deliver a request to other objects. The system will essentially see a call to the Messenger which will find out where this particular object is. In this illustration the Messenger will essentially pass the call on to that object.

The Object Manager (OM) must resolve both sides of the message operator. As mentioned earlier, since all of these objects are in the same class, they have the same essential coded features and corresponding method names. The Messenger must determine which of the features to use. It is the Messenger's job to find the correct piece of code and find the correct block of data, otherwise known as a data frame. The action is a segment of code, and the object actually identifies a block of data.

A particular employee instance can be represented by a doughnut, for example. The employee's age, date of hire, current salary, and her/his manager, can be represented as attributes in the center of the doughnut as defined by the class. Actions to be performed on the employee doughnut are positioned at various points surrounding the attributes, also as defined by the class.

An exemplary action would be a method to prepare the employee's paycheck. Another exemplary action would be to total the employee's vacation days, or "compute vacation". One of the functions could be GET_AGE, since age is one of the attributes. The GET_AGE method would be invoked when some other object has sent a GET_AGE message to an employee object.

The employee object provides the required information (AGE) in some readable form, e.g., as a 16 bit integer, or a calendar function, etc. The method establishes an interface by which the calling method must abide. Once established, the interface shouldn't be changed. However, how the employee object gets the age information that is provided in response to the GET_AGE command is not relevant outside the employee instance doughnut.

In another example, if we set Z equal to Z_GET_MGR@GET_NAME (where NAME and MGR are attributes on the employee and GET_NAME is a function supported by the system for purposes of this illustration), the value of the manager's name will be stored into the Z variable.

When an attribute is exported a routine can be automatically generated by the intermediate C preprocessor that will return that particular attribute value. Hence, a GET_NAME method need not necessarily be coded. The one can simply export the NAME attribute and the method GET_NAME will be automatically generated.

Cascaded message calls are also common in object oriented programming systems. The following is an example: EMP@MGR@NAME; both NAME and MGR have to be exported since they are attributes on the employee. The EMP@MGR call returns an object reference which then becomes the object that is used in the NAME message call. The calls are processed from left to right. The NAME is the attribute of the call and is on the right hand side of the right most message operator. In our example EMP@NAME would get employee's name and EMP@MGR@NAME would get his boss' name.

The Messenger is invoked with each message call to resolve Feature Addresses. It contains the logic for processing message calls to the different types of objects: class, instance, or slot objects. The "OBJ" located on the left side of the message operator is an object reference of a slot object.

Classes objects are managed by a Loaded Classes Table (LCT). Instances objects are managed by an Object Management Table (OMT). Pointers are used to point to class objects and instance objects. These pointers are called object references. Class objects and instance objects are referred to as frames and are not directly manipulated except by the methods which operate on them.

On the other hand, slots objects are not managed by a table. In the present OOPS, there is an optimization, called slot objects, in which data is actually manipulated by the containing frame or the containing method. Slot objects are passed as whole data structures. No pointers are used to reference slots.

The first piece of data, or first inherited attribute, in a slot is an object reference that merely points to itself (this is called a self reference). Following the object reference is any other type of data defined by the particular slot object. Slot objects do not only exist inside of frame objects, they can also be local variables within a method. Hence, slot objects do not just exist in frames or other slot objects, they can also exist on the C program stack as local variables or on the program heap which is allocated memory.

A slot object is a copy of an instance of that slot object class. The structure of a slot object is identical to the default instance frame for a particular slot object class.

Slots are used for optimization. Since slots do not have to be stored in a table, they are cheaper to use. When a message is sent, the Messenger passes the address of the object reference. In a slot object, that address is also the address of the instance. The address of the object reference, which is the first piece of data within a slot, is the address of the slot object.

In the present OOPS, manipulating of objects is realized using slots, each of which contains an attribute of the data in the slot. Slot objects are data areas that have methods on them. They are not "true" objects in the general sense of the word: they can only live within an enclosing instance or as local data within a method. This means that they do not have Object Management Table (OMT) entries and are not visible outside of their enclosing instance or method.

The preferred embodiment of slots objects is covered in co-pending, commonly owned application Ser. No. 425,746, filed Oct. 23, 1989 titled: Slot Objects for an Object Oriented Programming System, the disclosure of which in its entirety is incorporated herein by reference.

Figure 3:
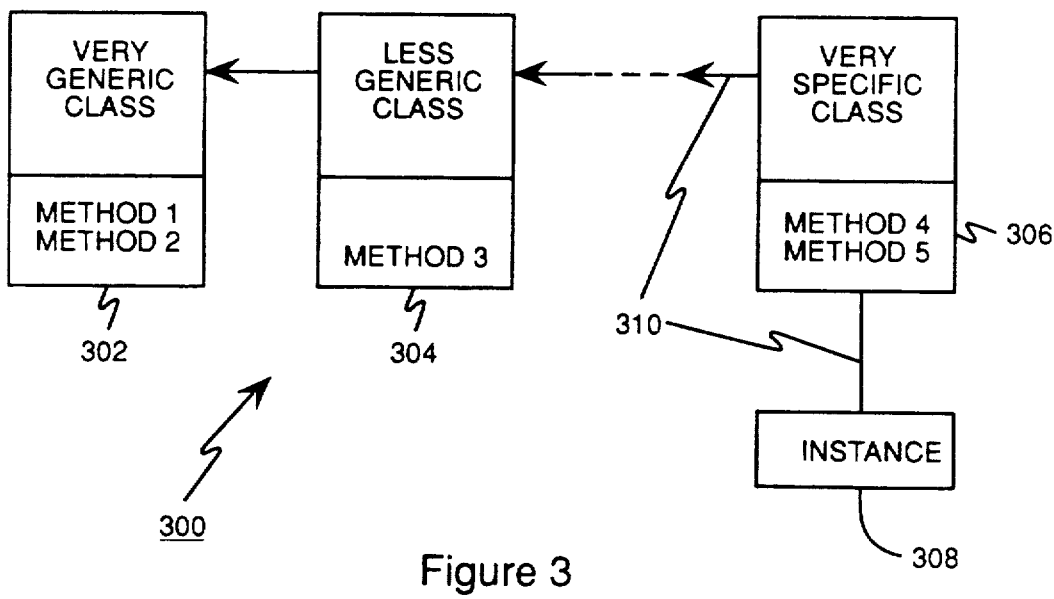
FIG. 3 shows inheritance links between related classes in connection with the present invention.

FIG. 3 shows three classes 302, 304, and 306, respectively, which represent a sample inheritance link 300. Link 300 includes a total of 5 methods. Two of these methods, Methods 1 and 2, are found in the class frame at the far left of FIG. 3 as features of the Very Generic Class 302. The Less Generic Class 304 includes Method 3, and the Very Specific Class 306 includes Methods 4 and 5.

Instance 308 of class 306 has available methods 1-5, which includes all inherited methods 1-3 and locally defined methods 4 and 5. Any of the methods could be exported for public use.

Figure 4:
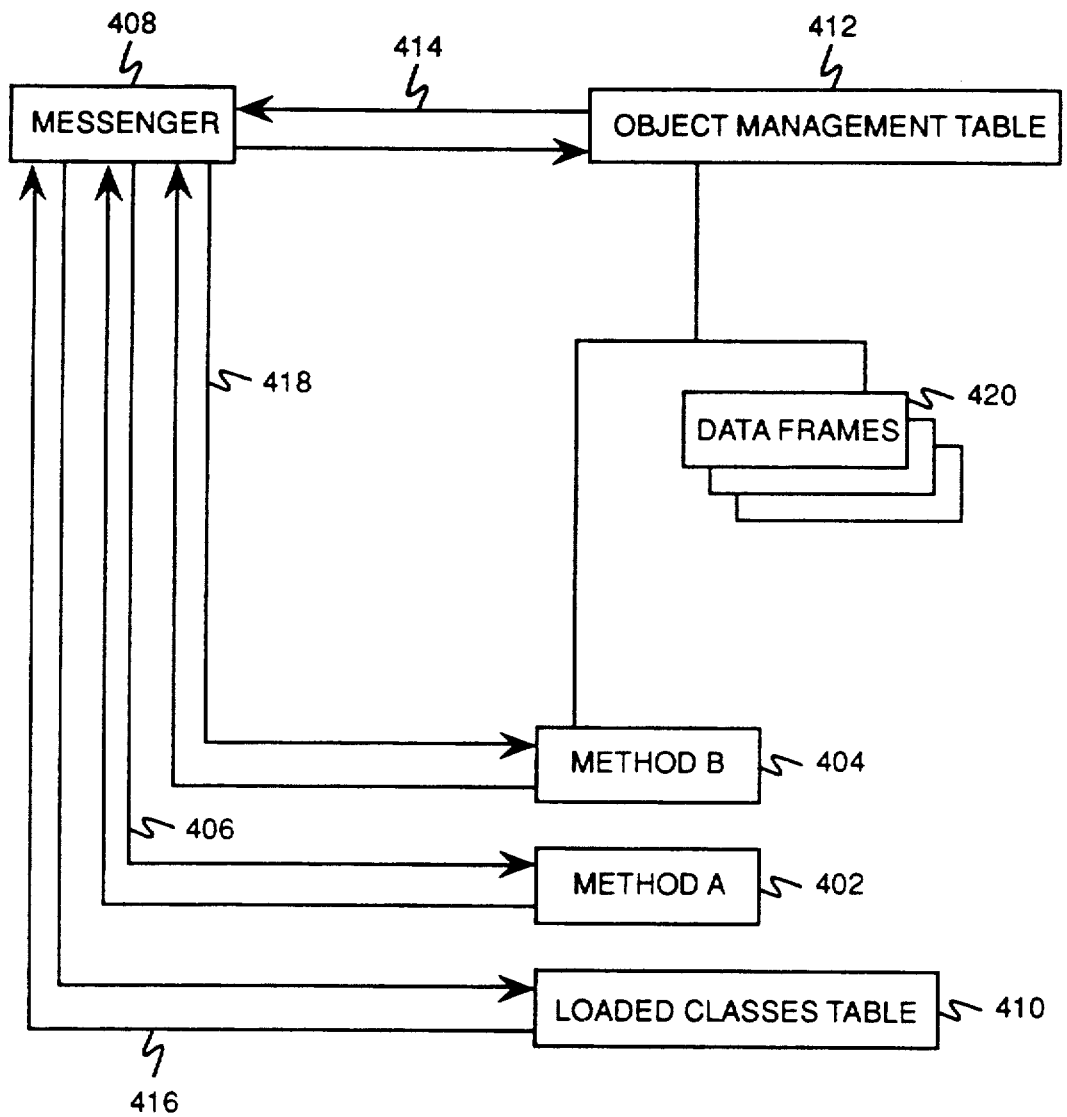
FIG. 4 shows a messaging system in connection with the present invention.

The flow for the invocation of an instance method depicted at FIG. 4 may yield a better understand of the role that the Object Manager (OM) plays in implementing the object oriented environment.

At a high level, the OM must resolve the class, the default instance data addresses, and the Security Table (ST) address by going to the Loaded Classes Table (LCT). The LCT must determine if the class is in memory, because OOPS dynamically loads the classes which are compiled modules. If the load module is not currently in memory the LCT uses the CRT to bring the load module into memory, i.e. the class and the default instance data. If the object is an instance, the Messenger asks the OMT for the indirection pointer to the instance or data frame, and if the data frame is not in memory then it will be materialized at this time.

More specifically, Method A of some instance 402 sends a message to Method B of some instance 404, which results in a call 406 to the Messenger 408. The Messenger 408 must resolve class and default instance data addresses, and the ST address by calling the LCT 410. If the class of instance 402 has not been loaded, the LCT 410 will load it at this time and then call the class to materialize its data. For purposes of the following example, assume that the instance's class has already been loaded and control is returned to the Messenger. (Dynamic linking or loading of classes will be discussed below.)

If the object is an instance the Messenger asks the OMT 412 for an indirection pointer to the data frame of the instance object specified by the message. For the purpose of the following example, assume that the instance is already in memory. Once the instance object is located in the table, the OMT 412 returns the indirection pointer to the instance object, as shown by arrow 414.

The Messenger 408 calls the LCT 410 for the address of the method specified by the message. At the same time, it establishes the class and default instance data offsets for the method so that it can access the correct data within the object. The LCT 410 searches the classes for the specified method and returns the address of the method to the Messenger as depicted by arrow 416.

Using the address just received from the LCT 410, the Messenger 408 will call Method B 404 as shown at arrow 418, passing it a system data area, an anchor block and the parameters from the call made by Method A. The system data area has, among other things, the indirection pointer returned by the OMT 412.

The system data area has pointers to permit the method to access the object on which it is operating. It includes the pointers to the class data object address, the default instance data object address, the instance data object address, the security table, the indirect instance frame address, the direct instance address for slot objects, the address of the method being invoked, and the class and instance data offsets. The system data area appears on every message and is initialized by the Messenger. The system data area is where the Messenger stores its results to be passed to a called method.

The anchor is where the OOPS stores all the global information about the system, such as the address of the Messenger routine. The anchor also includes the addresses of all the tables.

In a preferred embodiment the Messenger does not actually call Method B. The Messenger will simply return the method address and fill in the system data area. The message is expanded such that a function call to the method address is generated for the call to Method B within the Method A code. This allows the Messenger to be removed form the execution stack. Otherwise, if the Messenger actually did invoke Method B directly, the Messenger would appear in the execution stack between each method invocation. Where methods are deeply nested, this could mean a significant amount of unnecessary overhead. This also allows any number and type of parameters to be passed from A to B. However, it also means that the Messenger is unable to monitor return data.

Method B accesses the object on which it is operating using the pointers in the system data block. For example, if Method B is an instance method, it will access data frame 420 using the indirection pointer which points to the data through an entry in the OMT 412. Alternatively, if it is a class method it will be accessing the class data and the default instance data.

A low-level description of the above messaging scheme will explain the "under-the-covers" implementation of the present invention's Messenger and Object Manager to implement an object oriented environment.

Generally speaking, a class is a separate Load Module (LM) which contains five discrete components:
1. Class Frame
2. Default Instance Frame
3. Security Table
4. Messaging Tables
5. Compiled Code Classes have two frames: one for their class attributes and one for the default instance data values.

The Class Frame (CF) contains the current values of the class attributes of the particular class. These default values are defined at class build-time, but may be overridden at run-time. The CF is a heterogeneous, ordered grouping of primitives. In this context, the term primitive refers to a C language primitive or structure, an object reference, or a slot object.

Figure 5:
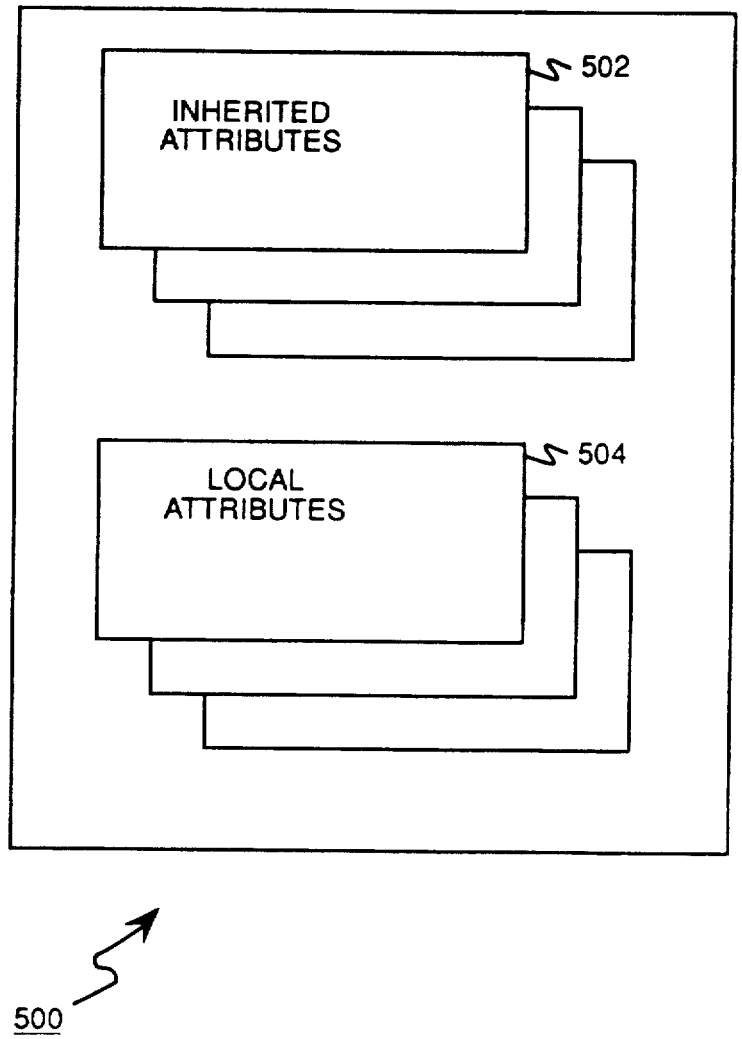
FIG. 5 shows a class frame in connection with the present invention.

A very generalized Class Frame is shown at 500 of FIG. 5. CF 500 is a grouping of the inherited class blocks 502 that a class inherits from its ancestors and any local class blocks 504. A block comprises the attributes that are local to a particular class. If all inherited and local blocks are empty, the class frame would be empty, (i.e., length zero).

When an application program is running on OOPS, only one copy of each class is loaded into main memory via a load module. A load module may comprise numerous classes, but in a preferred embodiment, each load module includes only one class. A class is either loaded when the OOPS is compiled, or more commonly, the class is dynamically loaded and linked as its features are called by objects during execution of an application program.

Figure 6:
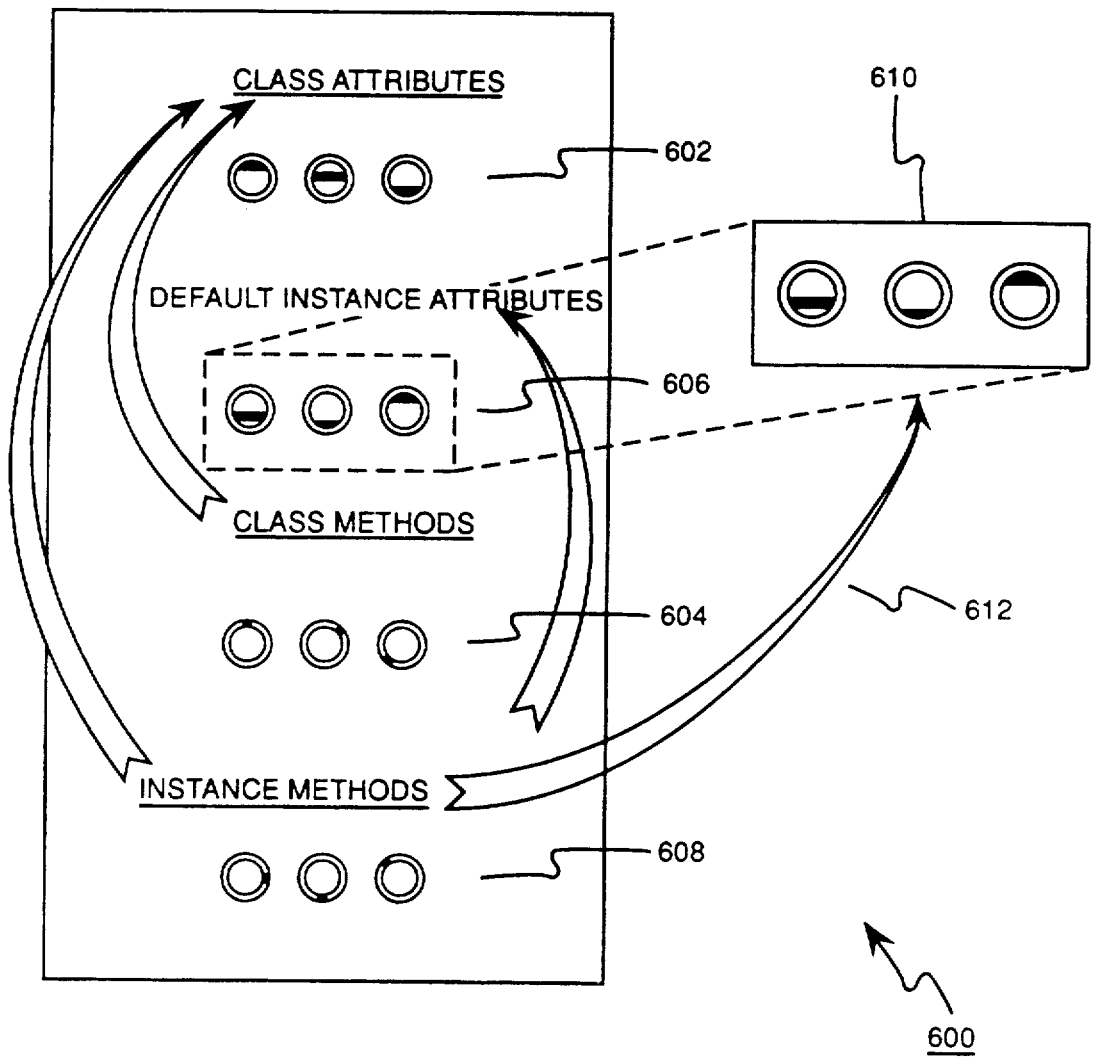
FIG. 6 shows a sample class frame in connection with the present invention.

A class, shown generally at 600 of FIG. 6, contains class attributes 602, class methods 604, default instance attributes 606 and instance methods 608. The methods section contains pieces of code that are designed to work on the data located in separate data areas.

Class methods 604 only know about class attributes 602 and default instance attributes, because class attributes are never copied during the creation of an instance. Only the class methods can work on default instance attributes 606. Any class method 606 can update any default instance attribute 606.

When an instance of a class is created the class' default instance attributes are copied into the new instance 610. As noted above, the code for the methods 608, or features, is available to the new instance; it is not copied. Messaging tables provide the mechanism by which instances access their inherited features and will be discussed in further detail below.

The default instance attributes 606 of the class are not acted on by the instance methods, since the called instance is given its own copy of instance attributes. Instance methods 608 can work on the class attributes 602, but rather than be able to work on the instance attributes 606 of the load module, instance methods work on the copies 610 of the instance attributes.

The load module comprising the class is maintained in persistent DASD, so the in-memory version of the class can be changed. The arrows 612 on FIG. 6 point to the attributes on which the specified methods can act.

Figure 7:
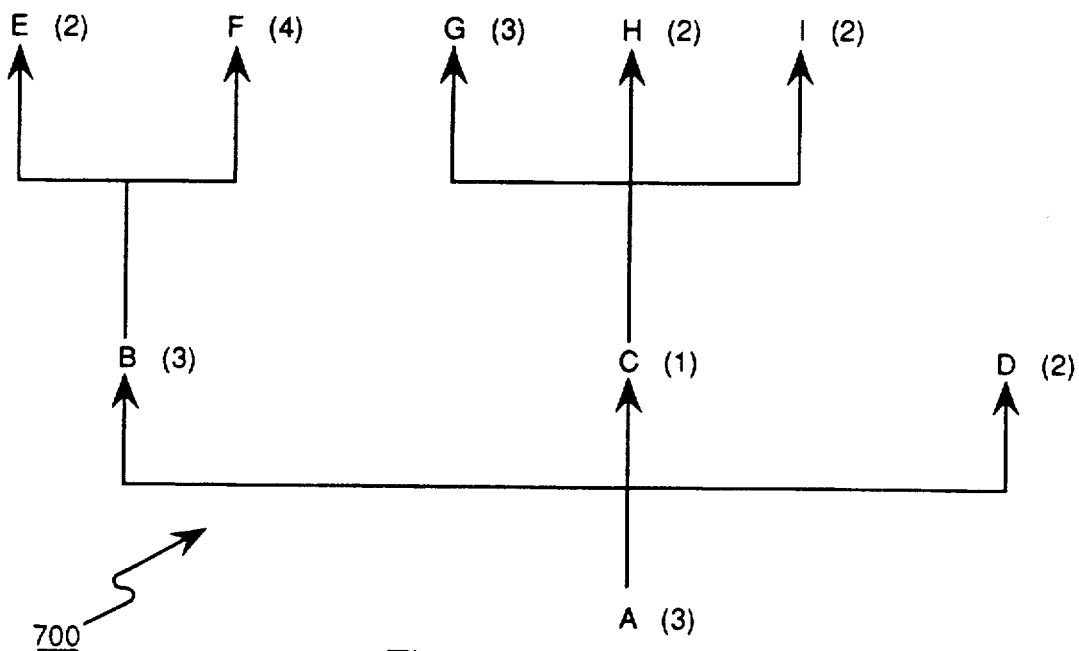
FIG. 7 shows a sample inheritance hierarchy in connection with the present invention.

FIG. 7. is a scenario showing a possible inheritance hierarchy and how the CF is constructed from this inheritance relationship. FIG. 7 shows the class inheritance hierarchy of classes A-I. Classes E, F, G, H and I at the top of FIG. 7 are called base classes.

Base classes do not inherit from other classes. Class B is considered a "child" of both classes E and F. Likewise, class C is a child of classes G, H and I. Therefore, E and F are "parents" of class B; and G, H and I are parents of class C.

The arrowheads of FIG. 7 represent the "inherits from" relationship. Hence, B inherits from parent E and F, and C inherits from parents G, H and I. It follows that class A inherits from classes B, C and D. Moreover, class A is a descendent of classes B-I. Class D, however, like classes E, F, G, H and I, inherits from no other classes. By definition, a class is a descendent and an ancestor of itself. For the purposes of this scenario, the values in parentheses represent the size in bytes for locally declared class attributes.

In summary, a CF is an ordered grouping of any inherited Class Blocks plus local Class Blocks (if any local attributes were defined). The Class Block is the ordered set of class attributes defined in a single class. Class Blocks are ordered by a post ordered traversal of the inheritance tree of FIG. 7.

Figure 8:
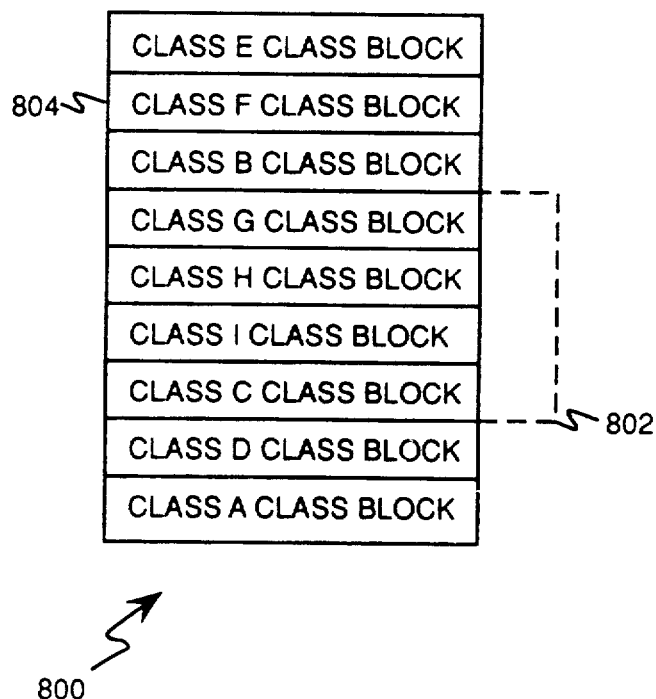
FIG. 8 shows a further sample class frame in connection with the present invention.

A CF 800 for class A is shown at FIG. 8. The ordering of the data areas permits one to reconstruct the class frame structure for any class from which class A inherits. For example, the portion of the CF pointed to by 802 is identical in structure to the CF for C.

Every inherited CF can be reconstructed according to the ordering of the Class Blocks in the current class. This particular ordering allows inherited methods to operate upon the data in the structure format of their implementing class. This structure thus supports multiple inheritance; however, this structure does not support repeated inheritance. Repeated inheritance is when two ancestor classes have a common ancestor.

The Default Instance Frame (DIF) contains all the default values for the instance attributes of a particular class. (See 606 for example.) These default values are defined at class build-time, but may be overridden at run-time.

A DIF is a heterogeneous ordering of primitives. An object's data consists of all data inherited from parent classes plus the locally defined data. It is possible for a DIF to inherit no attributes from its ancestors. In addition, a DIF may have no locally defined attributes. An empty DIF (i.e., length zero) would have no inherited or locally defined attributes. shown in FIG. 7, a DIF for classes A-I would be similar to the CF of FIG. 8. Each block 804 would relate to a particular class, "Instance Block", as opposed to the "Class Blocks" shown in FIG. 8. Hence, the DIF is constructed exactly the same way as the CF, with each entry in the DIF being an Instance Block of a class, arranged in post ordered traversal.

Figure 9:
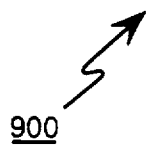
FIG. 9 shows a security table in connection with the present invention.

The Object Manager and Messenger of the present invention also supports a Security Table (ST) which contains a security flag indicating whether each method's authorization should be checked. FIG. 9 represents an exemplary ST 900 in connection with the invention. The Messenger checks every message call against the ST to ensure that the user has sufficient authority to access the feature.

Each ST entry has two states, that is, it is a boolean. A "true" state indicates that the message does not need to be checked. In essence, the Security Table simply determines when security checks need to be performed.

Each feature in the ST has a corresponding entry in the Feature Table (FT). The ST is not stored in the FT because the FT is constructed at build time during the development of the classes supported by the OOPS. On the other hand, the ST is initialized at run-time and is customizable by the customer. The ST is a persistent table (i.e., it survives application run sessions; all ST class booleans may be stored in data storage 124, for example), and thus may be customized by the user.

The ST is indexed by the position of the Feature Number within the FT. That is, if Feature Number 6 is the 2nd entry in the FT, then its corresponding entry in the ST is also the 2nd entry.

The present invention also supports messaging tables that are used by the Messenger to send or deliver a message. The two messaging tables are the Ancestor List and the Feature Table.

Figures 10, 11A, 11B:
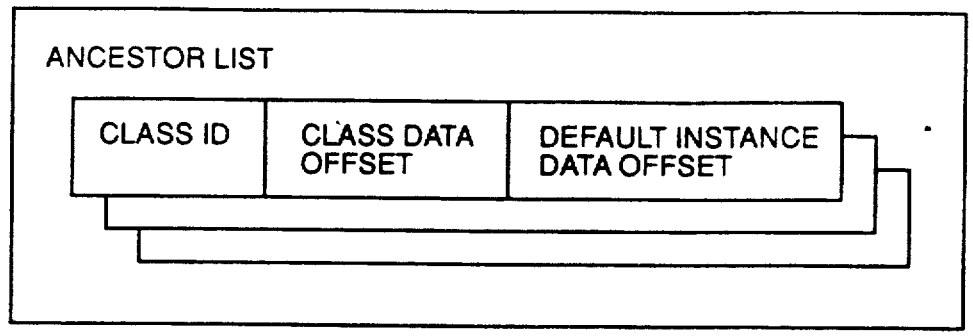
FIG. 10 shows a generalized ancestor list in connection with the present invention.
FIG. 11a and 11b shows a sample ancestor list in connection with the present invention.

Each class includes an Ancestor List (AL) that lists inherited classes, i.e., parent classes. An example of an Ancestor List is shown in FIG. 10. Each ancestor entry in the AL contains three fields. The Ancestor's class id is the class id of a particular ancestor. The Ancestor's class data offset is the address offset from the start of the current class frame to the first class block in the ancestor's class frame. The Ancestor's instance data offset is the address offset from the start of the current instance frame to the first instance block in the ancestor's instance frame. Each of these fields is represented as a long integer (4 bytes).

The AL is constructed and ordered at build time with the same algorithm used for the frames (i.e., post order traversal of the inheritance tree). It is indexed using the index stored within the FT entries.

These address offsets play an important role in the OM's ability to provide multiple inheritance. They are needed to skip to the start of where that method's frame begins within the current class.

Two ALs are shown in FIGs. 11A and 11B. They have been constructed using the data frame lengths shown in parentheses at FIG. 7. Consider a message sent to an instance of class A on a method being invoked inside of class H. This method will need an offset to find the data belonging to class H. Therefore, an offset must be stored in A's ancestor list. To locate the address for the beginning of the instance block for class H, the data areas for class B (including the data areas for classes E and F) and for class G must be skipped over (the total size of the locally declared instance attributes of classes E, F, B and G being 12).

The offset for class A is at zero, because class A knows its ancestors. Corresponding class C also has zero offset. In FIG. 11B, H is offset 3, the total r size of class G. Similarly, I is offset 5, which is the sum of G and H. Thus, to access a class, the 0M supplies the beginning address of the host class and any necessary offset.

As a further example, consider the message: a@c; (this is a method on an instance of class A and the method is implemented in class C). C's action or method has to work on the instance of a, because C only knows about itself and its ancestor's methods, and it only knows about C's data. Therefore, C must be given a familiar data structure, that is a type C data structure. Since the object is a, the OM refers to a's ancestor list to supply C with the appropriate data. Hence, C is pointed to a plus an offset of 9. The necessary addressability is supplied by the LCT.

FIGs. 11A and 11B only include two columns, each column representing multiple table entries of a single field. However, the default instance data offset, the omitted field, is constructed in the same fashion as the class data offset field. Different values exist for the class data offset versus the default instance data offset.

An example of a FT is shown at FIG. 12. A class contains FT entries for each available feature, whether the feature is directly implemented or inherited from an ancestor class. The FT is created at build time.

The Feature Number is a long integer used by the class to identify each feature. The Ancestor Index is also a long integer. The Ancestor Index is an index into the AL for the class which implements this feature. The Ancestor Feature Number is a long integer and is a number that the ancestor class uses to identify the feature. Finally, the Feature Address is a far pointer which points to the feature (method) code if the feature's class is loaded. If a class inherits a feature from an ancestor, the Feature Address entry contains a NULL (zero address) Feature Address.

The FT is searched during a message call to resolve the address of the specified feature (i.e. the piece of compiled code which represents the implementation of the feature).

A feature may be redefined or renamed. In addition, combinations of redefinition and renaming are supported. The redefinition will be locally implemented and it will have the same feature number as the old feature. The rename becomes a brand new feature with a new feature number, but it can map back to the old feature, i.e., it is not locally implemented. This permits the new definition to call the old routine.

Figure 13C:
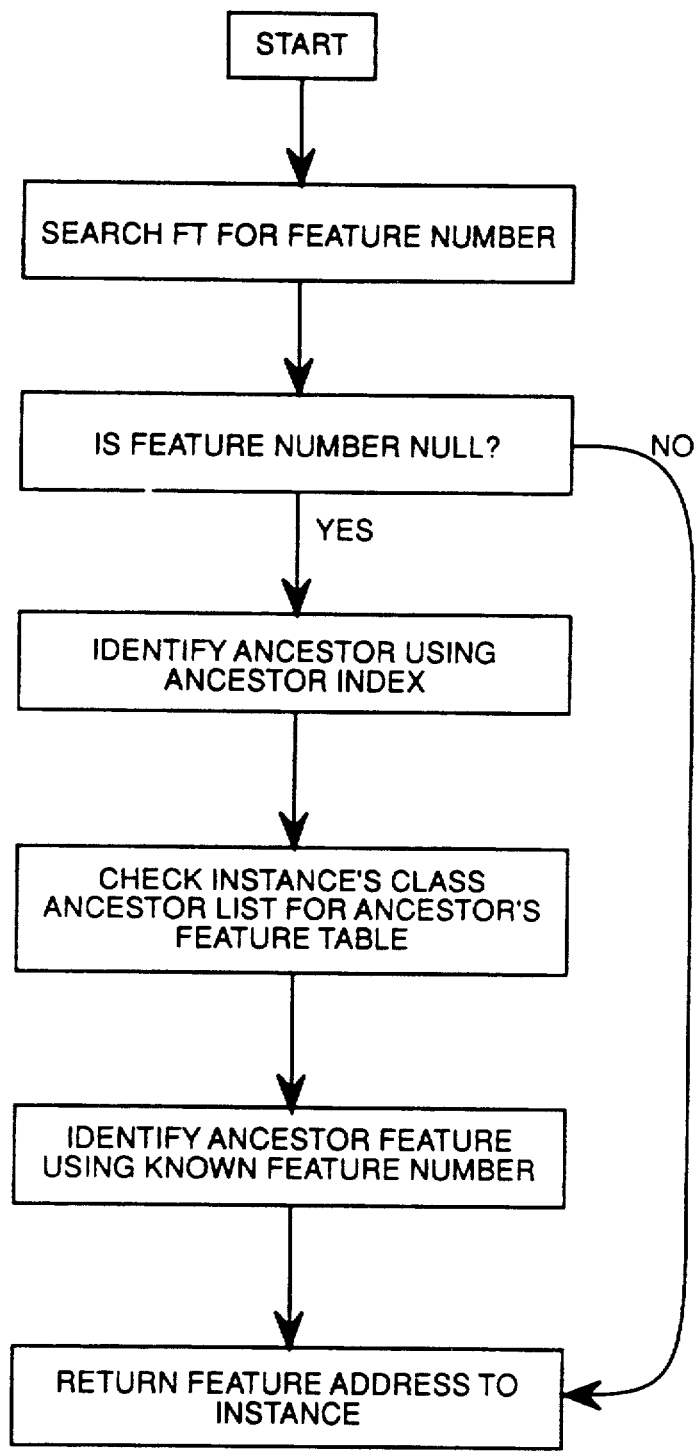
FIG. 13C is a flow chart for resolving a feature address in connection with the present invention.

FIGS. 13A, 13B and 13C show a further example of an inheritance link to help explain feature redefining and renaming. The present OOPS also permits various combinations of feature redefining and renaming. Six combinations will be discussed in detail below.

1. Simple inheritance

A simply inherits feature D-1 as shown in A's FT.

2. Rename

A feature that is only renamed has a new name but not a new implementation. The implementation is inherited. For example, in class B, B-4 is mapped backed to C-1. B-4's ancestor index points to ancestor class C and feature number 2 indicates the inherited C-1 feature. Thus, the feature address of new name B-4 is resolved as xFF by mapping to class C's FT. New feature B-4 is cascaded into class A's FT.

3. Redefine

A feature's method is simply redefined. The feature number remains the same, but a new implementation is found in the feature address. For example, in B's FT, feature D-1's feature number remains the 5, and a new address is xD1. This new feature must also be cascaded into class A's FT. In A's FT, D-1 feature number is 5. Its ancestor index is to the class B, because class B is where D-1 was redefined. Therefore the index is 2. The ancestor feature is also 5, and the feature address is null.

4. Redefine and rename

A feature is redefined so that it keeps the same name, but is given a new implementation. A rename gives access to the old implementation, but under a new name and new method number.

In A's FT, the B-3 feature is redefined as number 4; its ancestor index becomes a dash; and it is locally implemented as indicated by hex address x1E.

Feature A-2 renames the B-3 feature and has a new feature number 11 and it has a null feature address. A-2 must therefore map back onto an old feature. A-2's ancestor index is 2, thus it maps back onto an old feature of class B. A-2's ancestor feature number is 4 which indicates feature B-3 as seen in class B's FT.

Hence, feature number 4 is locally implemented, and feature number 11 maps back onto feature number 4. This permits the old feature B-3 of class B's FT to become redefined as new feature B-3 in class A's FT. In class A, both the old B-3 method can be called via A-2, and the new feature can be called via B-3.

5. Rename a feature and redefine the new name

This provides a new implementation under a new name. The uses the same feature number, but a new feature address. These is no call to get back to the old implementation.

For example, A-1 in A's FT is a redefinition of B-1 of B's FT. Therefore, A-1's feature number is 7, thus referring to B-1. The new name is then given a new implementation feature address xF.

6. First rename a single feature twice, and then redefine one of the new names

This permits a redefinition under a new name and another name that permits calls to the old implementation.

When searching for feature B-2, for example, which has been invoked on an instance of A, A's FT is first searched for the Feature Number. If the Feature Address is not NULL, then the feature is implemented locally, and thus addressable (i.e., the corresponding class need not be loaded).

If the Feature Address is NULL (see A's FT), the feature is inherited and implemented by an ancestor. The Ancestor Index must be used to index into A's Ancestor List to find which Ancestor implemented this feature. Using the Ancestor Feature Number also found in A's FT, (9 in this example), the system jumps to Feature 9 in B's FT to determine the Feature address. Recall that the Feature Address will contain the beginning address of the feature locally implemented by the ancestor.

The flow chart at FIG. 13C shows the flow of the above described process.

Figure 14:
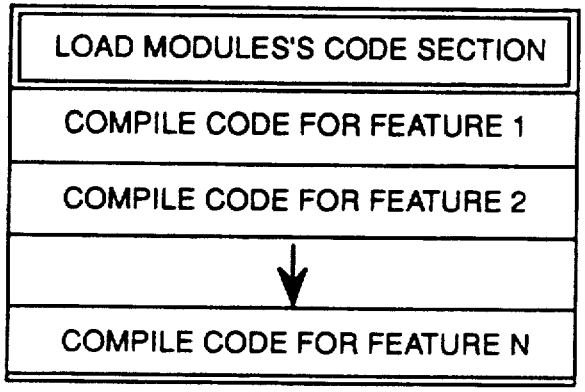
FIG. 14 shows a load module's code section in connection with the present invention.

All the features locally implemented within a class are stored in a Compiled Code (CC) section of the class, load module. A load module's code section is shown at FIG. 14. As discussed above, entries in the FT contain the address of the entry point (Feature Address) for each method that is locally implemented.

An instance comprises an Instance Frame (IF) and a Variable Area (VA). The IF has a structure identical to the DIF of the same class. The VA is variable sized portion of the frame below the IF.

Figure 15:
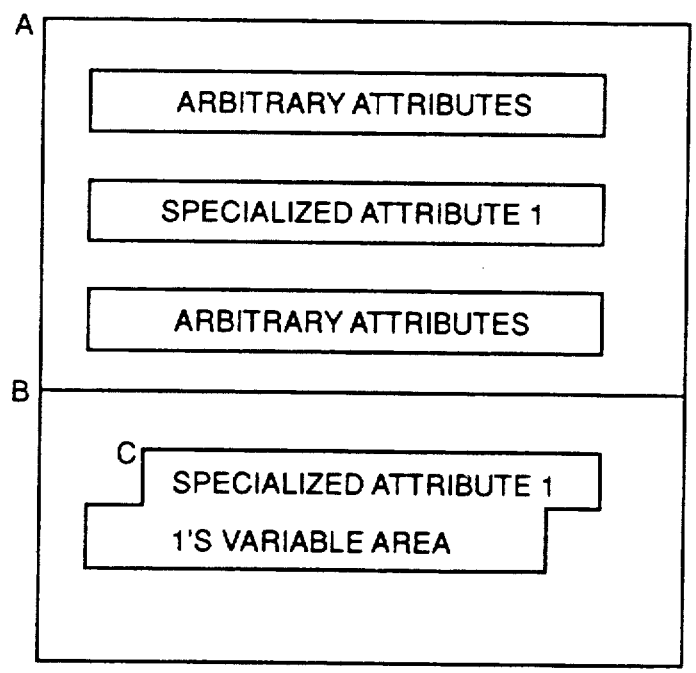
FIG. 15 shows an instance frame and its associated variable area in connection with the present invention.

The VA can be zero or as large as physical contiguous storage will allow. An IF and OM allocated VA are shown at FIG. 15. The IF begins at address A and the VA begins at address B. VA can be used for variable sized data accessed by specifically enabled instance attributes as well.

It is the responsibility of the IF to control utilization of the VA by the specialized instance attributes. It is the responsibility of specialized instance attribute 1 to maintain the offset of the beginning of the locally defined VA C. Specialized instance attributes must also keep track of the total amount of VA locally allocated.

It is important that the VA be addressed in terms of offset from the IF's address. This allows the IF to be moved around in physical memory as required without impacting any of its attributes which reference IF's VA.

The Object Manager Table (OMT), discussed in more detail below, only keeps track of the address of A (the beginning of the IF). The IF includes a first offset for A to B which indicates the static size of the frame which does not change. If a specialized attribute is a primitive of the instance, the IF includes a second offset form A to C so that specialized attribute can determine its VA's beginning address. The offset from A to C is typically different for each specialized attribute.

The Class Table (CT contains static information about each class known to the system. The Class Table (CT) is shown conceptually at FIG. 16. Each Class Table Entry (CTE) 1602 comprises several fields.

The Class ID is typically represented by a long integer. Each class has a unique number.

The Replacing Class ID is also a long integer and is the unique class number for a replacement class which is a new class in the system. The implementation of a replacement class will be explained by example.

The OOPS is assembled as a software product including a set of original classes for licensing to customers or vendors. Each licensee is given a particular range of class IDs to which new classes may be assigned. A customer or vendor may wish to perform a function not supported by the original classes supplied to the customer along with the OOPS. To resolve this problem, the system permits the customer or vendors to write code for a new replacement class. The existing class is replaced with the new class.

A replacement class must be a descendant of the class it is replacing. The user redefines the methods desired to be changed, adds any new methods to the class, or adds new attributes. The previously existing class is then replaced with the new child class. Calls to the old class are then redirected to the child class. If a replacing class id is present, the class pointed to is searched for a further replacing class until a subsequent replacing class id is null. The search then stops and the class id of this class is used.

In a preferred embodiment, a class reference is obtained by calling a routine and passing the routine a class number. The routine scans to determine the final class number after scanning any replacement classes. The routine then returns a class object reference with the final replacing class's class id in it.

The Short Name is a unique 8 character string. This is the name used for identifying a class. There is a one-to-one correspondence between the Class ID and the Short Name. The Short Name is beneficial for debugging purposes, for example. Rather than having to identify a piece of code by a number, it is more easily recognizable using the Short Name.

Each class is stored in a Load Modules (LM). More than one class can be stored in a single LM, but it is desirable to store each class in its own LM for optimized modularity. The LM Name is also a unique 8 character string and identifies a class LM.

In a preferred embodiment the Short Name and the LM Name are identical, and therefore, only one field is used to store the single name.

The CT must know where in the LM a particular class' code begins. Each LM has a routine called the fetch Entry Point. The address of this routine is returned by the routine that fetches the LM into storage. Therefore, the CT is given the address of this Entry Point routine. This is similar to the "main" command in a conventional C program. The CT Entry Point is a far pointer, and represents the address of the Entry Point for the class LM.

Figure 17:
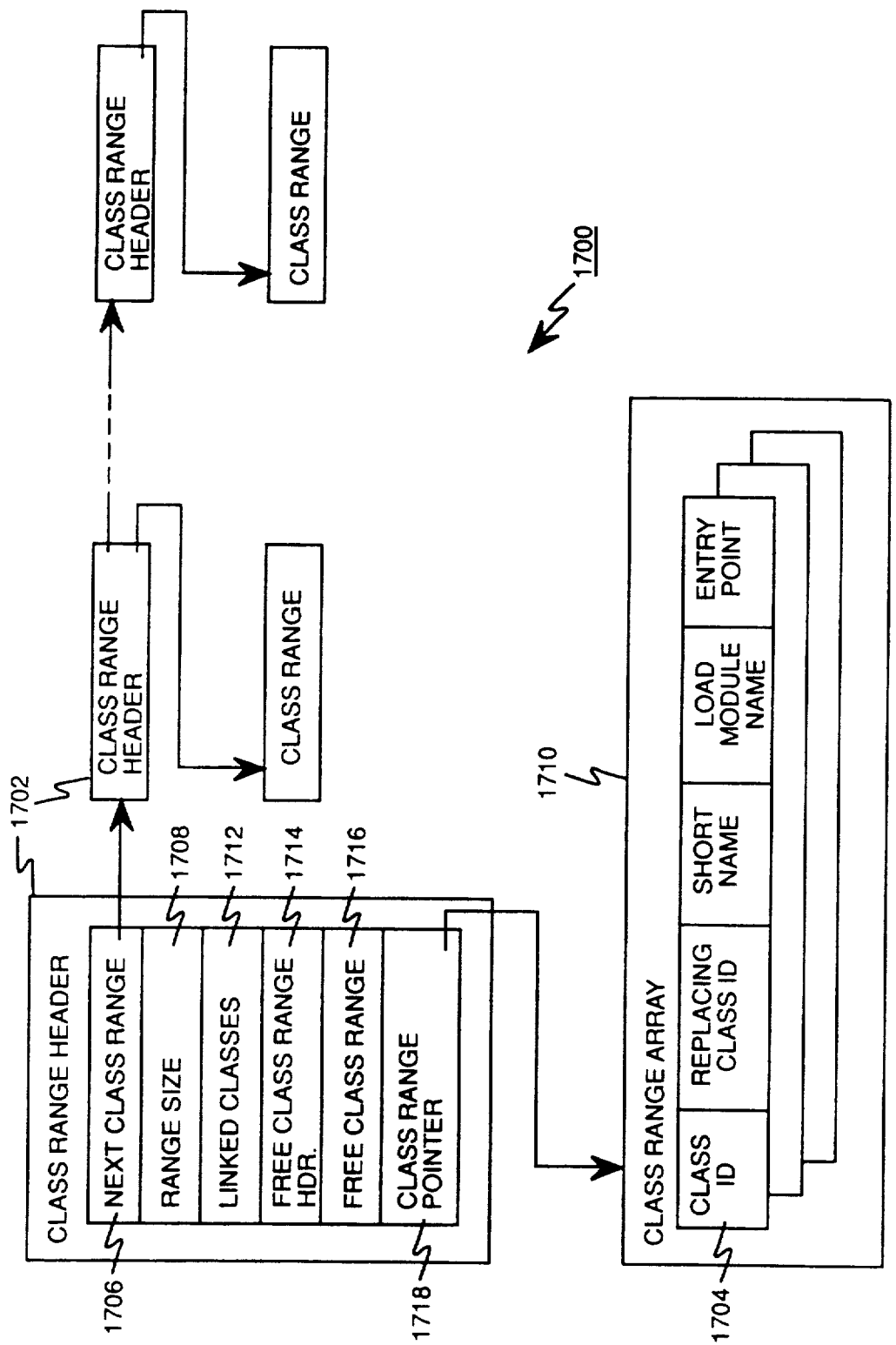
FIG. 17 shows a preferred implementation of a class table in connection with the present invention.

The CT defines all of the valid classes in the system. In a preferred embodiment, the CT is structured as a sparse array as shown in FIG. 17.

A sparse array is an array or vector in which all but a few elements are nonzero. The range of class numbers in the class table is large, and only a small percentage of the classes may actually be used. Thus, storage of the entire array can be wasteful of memory space. The present inventors have solved this problem by storing only those classes actually needed, finding them by means of an index or pointer in the sparse array.

As note above, blocks of Class IDs may be allotted to customers. Similarly, the original OOPS classes are grouped by a set of Class IDs. These groups of class IDs are separated into the individual Class Range Headers (CRH) 1702. There is no ordering to the CRH 1702. It is also possible that the range of Class IDs in separate Class Ranges may overlap.

Each Class Range is ordered by Class ID 1704 and can be searched using a binary search. The array index is not the Class ID. The entries must be in ascending order by Class ID, although the Class IDs need not be contiguous, that is, gaps between Class Ids are allowed within any one Class Range. The CRH identifies how many classes are in the range of numbers that are allotted to each customer, for example. An individual customer may be allotted more than one set of class range IDs. Therefore, more than one CRH may exist for a particular customer. The above examples are for explanatory purposes only, and are not intended to limit the scope of the present OOPS invention.

Each CRH contains a Next Class Range far pointer 1706 to point to the next CRH. The Range Size 1708 is a long integer and represents the number of entries in this CRH's Class Range Array (CRA) 1710, i.e., the number of classes. The equivalent of the CRA was discussed with reference to FIG. 16.

Linked Classes 1712 is a boolean field that indicates whether the classes in this particular range are linked in with the OM, or if these classes must be fetched before they can be used.

Condition "true" indicates that these particular classes are already linked; the entry point address for each CTE represents a direct routine address. Alternatively, condition "false" indicates that these classes must be fetched; the entry point address for each CTE represents a Fetch Entry Control Block (FECB) which points to the LM's entry point routine. The FECB must be released when the program exits or when the LM is released back to the system.

The CT keeps track of which built-in classes are or are not linked. However, the static or dynamic linking of customer added or replaced classes must be provided to the OOPS via the Linked Classes field of the CRH.

The CRH field Free Class Range Header (FCRH) 1714 is also boolean. The FCRH indicates whether the CRH has been malloced (memory allocated) and should be freed when the program exits. A "true" condition indicates that the CRH has been malloced and must be freed. A "false" condition indicates that the CRH was declared as a static structure and does not need to be freed.

When an OOPS session concludes, the OM realizes that it has allocated storage in various different locations of the system. If a particular class range header has been allocated memory space at compile time, there is no need to return this memory space to the system. If any CRHs are dynamically accessed during run-time, the OM actually allocated blocks of storage for all the correspondingly loaded information. As the OOPS shuts down, it releases this storage back to the operating system.

The Free Class Range (FCR) 1716 is a boolean field that indicates whether the CRA has been malloced and should be freed when the program exits. Again, a "true" condition indicates that the CRA has been malloced and must be freed, whereas a "false" condition indicates that the CRA was declared as a static array and does not need to be freed.

Lastly, the Class Range Pointer 1718 is a far pointer to the Class Range Array associated with this CRH.

Each entry in a Class Range Array 1710 contains the same fields as the conceptual model of a Class Table Entry discussed above with reference to FIG. 16. It may be desirable to group the classes implemented by a single application in a one class range array.

Figure 18:
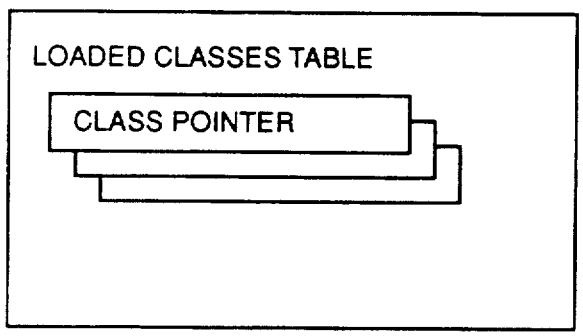
FIG. 18 shows a generalized loaded classes table in connection with the present invention.

The LCT keeps track of those classes which have already been loaded into memory. A conceptual representation of an LCT is shown at FIG. 18. The entire system is not linked into one large load module as are most programs. Instead, each class is an individual load module capable of dynamic loading. Classes are loaded as they are referenced; they are then left in memory for the remainder of the session. The LCT is also responsible for:

Resolving the Class Frame address.
Resolving the Default Instance Frame address.
Resolving the Security Table address.
Resolving the feature address.
Checking security during message calls if so indicated by the Security Table.

The entries in this table are pointers to each class. It is ordered and indexed by Class ID. If a class entry is NULL, that means that a class is not yet loaded. When an unloaded class is first referenced, the LCT must ask the CT (which keeps track of all valid classes in the system) to load the class.

Figure 19:
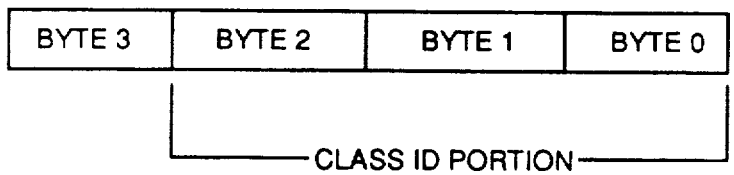
FIG. 19 shows byte ordering within a long integer in connection with the present invention.

In a preferred embodiment, the LCT is organized as a three dimensional array, indexed by each byte of the Class ID as shown at FIG. 19. A class consists of three bytes (24 bits). It is stored in the low order three bytes of a four byte (32 bit) long integer.

Figure 20:
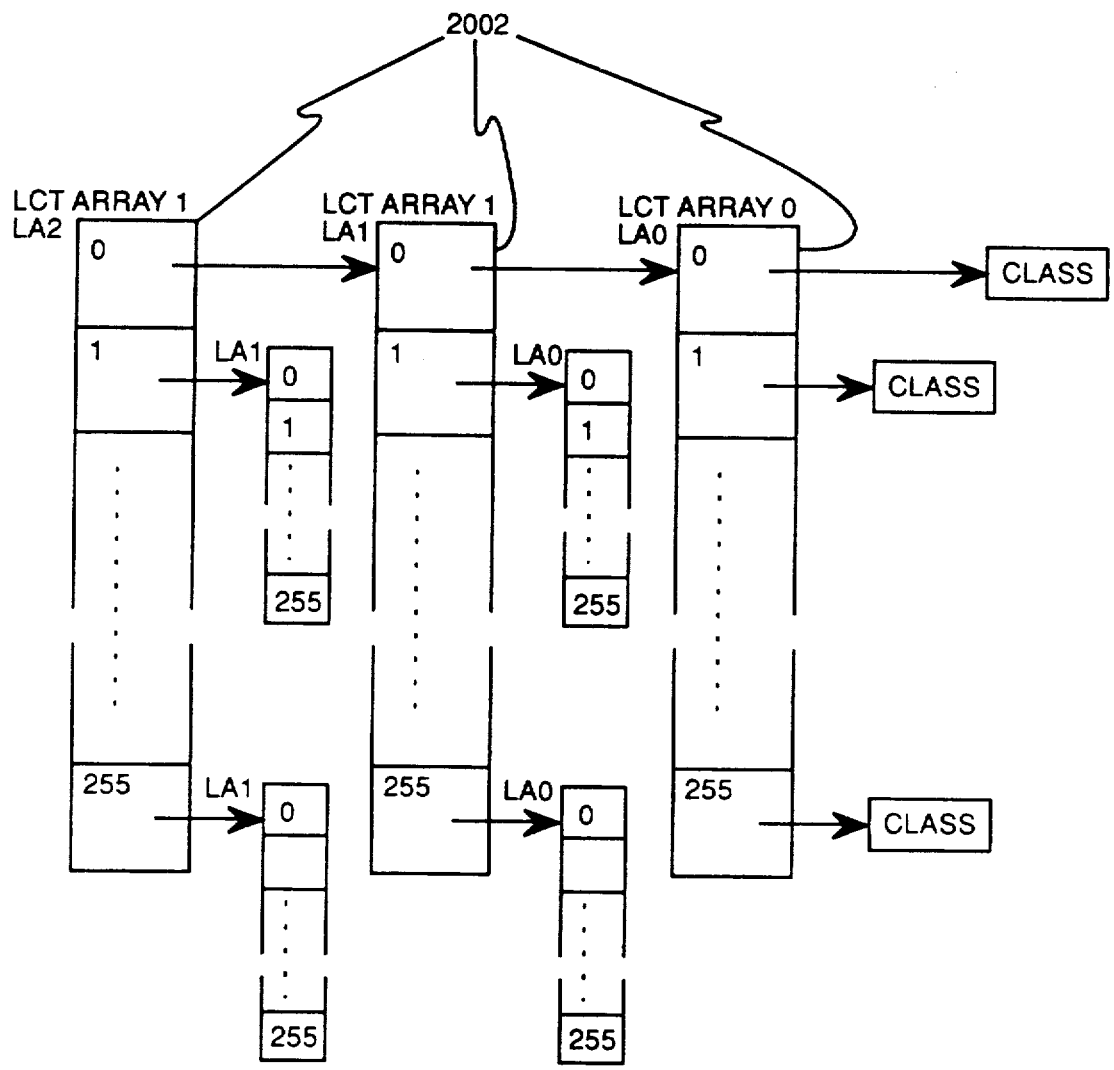
FIG. 20 shows a preferred implementation of a loaded classes table in connection with the present invention.

Although the LCT is used as a three dimensional array, it is not allocated that way. Instead of declaring arrays, pointers to array elements are declared instead. This allows one to separately allocate each of the 256 element one dimensional arrays as required. This optimizes the memory required to implement the LCT and permits $256^3$ possible classes (about 16M). An LCT sparse array is shown at FIG. 20.

The Class ID is used to index into the list as follows:
Byte 3 is ignored. (When a Class ID is part of an object reference, this byte is used for the object reference Type field.)
Byte 2 indexes into LCT ARRAY 2.
Byte 1 indexes into LCT ARRAY 1.
Byte 0 indexes into LCT ARRAY 0.

Figure 16:
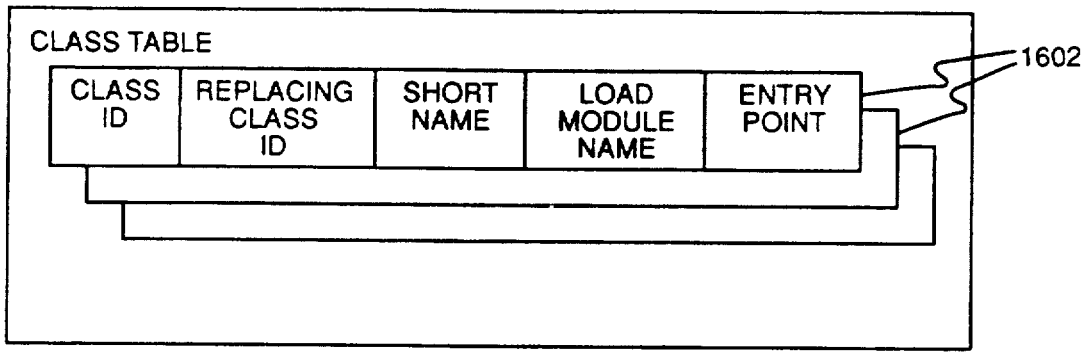
FIG. 16 shows a generalized class table in connection with the present invention.

The LCT arrays 2002 (LCT array 2, 1 and 0) correspond to bytes 2, 1 and 0 of the long integer of FIG. 16. The first array is indexed into with byte 2 which points to LCT array 2. A class address is pointed to if each LCT entry is reconciled with other than a null value.

The sparse array is indexed with every class request. LCT array 2 is indexed into with byte number 2, and if it's a null, another 255 byte array called LCT array 1 is allocated. LCT array 1 is then indexed into with byte 1. If it is null, another LCT array 0 of 255 pointers is allocated. It is then indexed into with byte 0. If that one is null, the class is loaded and a pointer is added to point to the class' address. Restated, the LCT is an array of pointers to an array of pointers to an array of pointers which point to a class, each array indexed by a single byte. When the far right is reached, the system recognizes a null value to mean that the class table must load the class and make the entry in the LCT.

The Object Management Table (OMT) keeps track of all the frames currently in memory. The responsibilities of the OMT include:

Store all newly created instance frames in the Current or Global Unit of Work (UOW).
Manage the creation of new UOW instances.
Manage the switching to any UOW instance except for the Global UOW instance.
Manage the new UOW levels to be started within the Current UOW instance.
Manage COMMITS or ROLLBACKS of the Current UOW level in the Current UOW instance:
  a COMMIT at level 1 should flush all persistent object instances to the database so that all change are permanently saved on the database,
  a commit or rollback at level 0 is not allowed.
Allow any instance frame to be resized by adjusting the frame pointers in the OMTFC (to be discussed further below) to point to the new memory location.
Allow any instance frame to be brought up to the Current UOW level in the Current UOW instance.
Resolve the instance frame address for each message call made to an instance frame or enclosed variable area slot object.
Automatically materialize persistent instance frames on the first message call to the instance frame.

Manage visitor instance frames from the UOW instances other than the global UOW or the current UOW instance.

The UOW provides a context in which work is occurring. When a message call is sent, the OM makes sure that the instance being sent the message is either in the Global UOW or in the Current UOW. The Global and Current UOW provide the two different environments in which work can be done. If the instance is not in the Global or Current UOW, but in some other UOW instance, a copy of that object is made and brought to the Current UOW instance. This is called a "visitor" object. The visitor object will stay in this UOW instance until UOW "commit time". At commit time, the changes must be saved, so the instance copies this new version back to its original UOW an overwrites the original contents.

Figure 21:
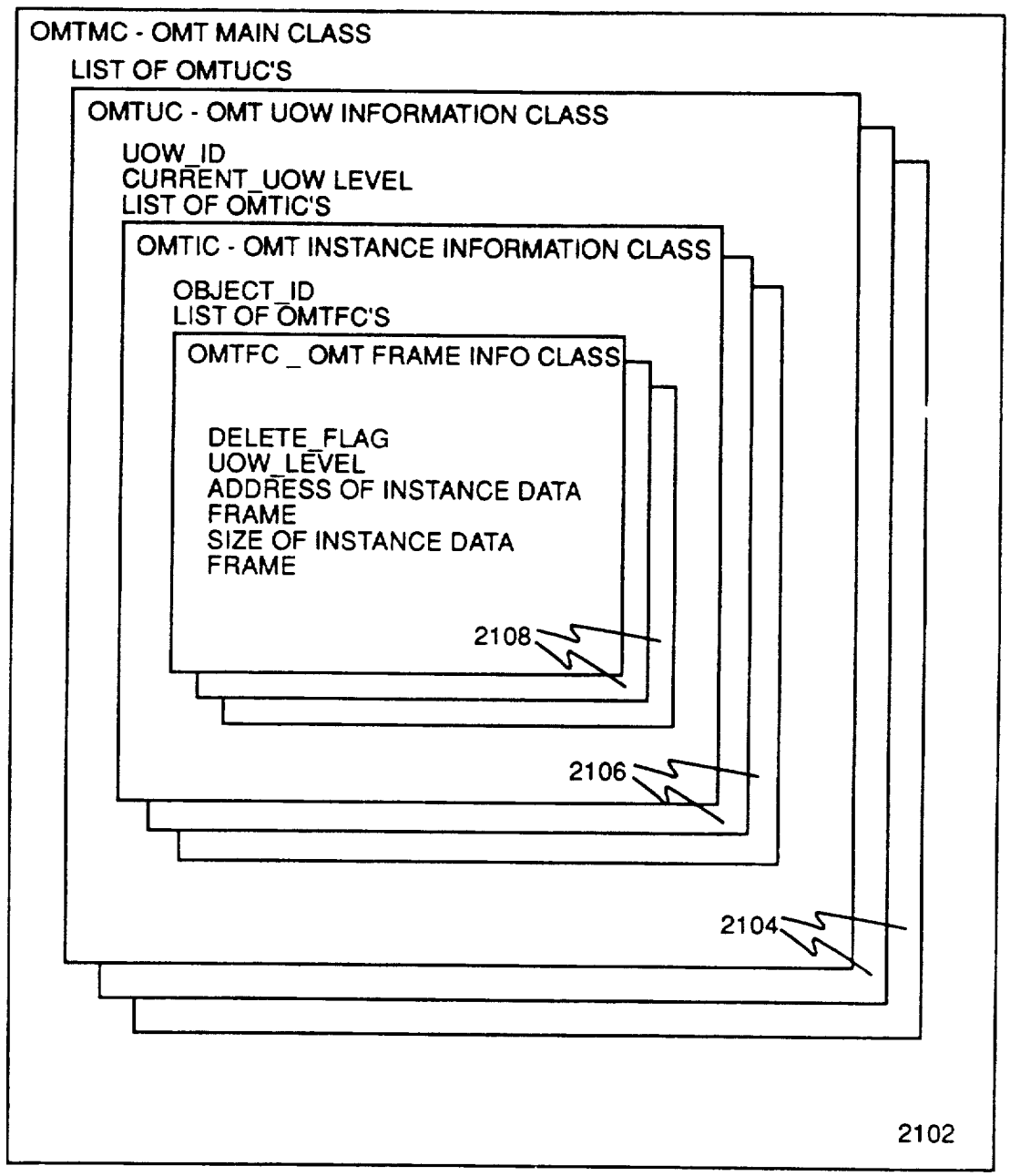
FIG. 21 shows an object management table in connection with the present invention.

Conceptually, the Object Management Table is a multi-dimensional array comprising four (4) related components. The OMT is shown conceptually at FIG. 21:

1. OMT Main Class 2102

The Object Management Table Main Class (OMTMC) is the anchor for the OM to access the entire OMT. This object contains a list of entries, one for each UOW instance, beginning with the Global UOW Instance. These UOW instance entries are ordered chronologically. In other words, the last entry corresponds to the UOW instance most recently created or switched to; the next-to-last entry corresponds to the previously accessed UOW instance; and the first entry corresponds to the "oldest" (the least recently accessed) UOW instance.

2. OMT Unit of Work Instance Information Class 2104

The Object Management Table Unit of Work Instance Information Class (OMTUC) keeps track of a UOW instance. It maintains a list of all the instance frames within this UOW instance. A new OMTUC is added to the list within the OMTMC when a new UOW instance is created. An OMTUC is deleted from the list within OMTMC when a UOW instance is discarded.

3. OMT Object Instance Information Class 2106

The Object Management Table Object Instance Information (OMTIC) keeps track of an instance frame within the Current UOW instance. It maintains a list of all the UOW levels generated for the instance frame. A new OMTIC is added to the list within OMTUC whenever an object is materialized or created. The OMTI C is deleted when its containing OMTUC is discarded or when the instance frame has been marked for deletion and a commit is done at UOW level 1.

4. OMT Frame Information Class 2108

The Object Management Table Frame Information Class (OMTFC) keeps track of the frame at a particular UOW level within the OMTIC. Additionally, it maintains a "delete" flag to indicate whether or not the instance is to be deleted. A new OMTFC is added to the list within OMTIC when a UOW Notify is issued against the corresponding instance and the data frame is not at the Current UOW level. The Current UOW level is found within the OMTUC. A OMTFC is deleted whenever its UOW level is committed or rolled back, or otherwise discarded.

Figure 22:
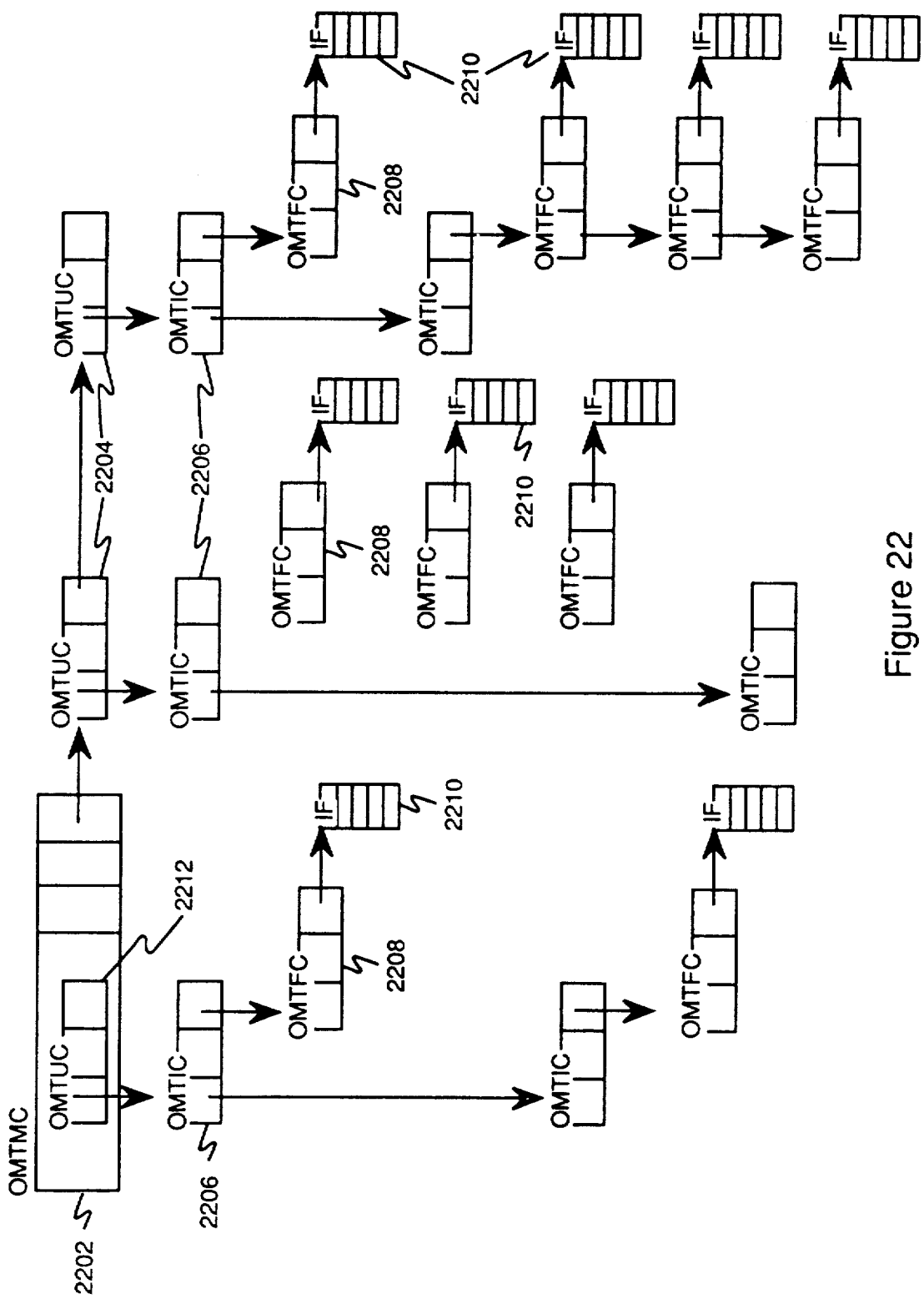
FIG. 22 shows a preferred implementation of an object management table in connection with the present invention.

A preferred embodiment of the OMT shows a linked list format for a sample group of Instance Frames as shown at FIG. 22. The OMTMC 2202 anchor contains an OMTUC for the Global UOW. Additionally, the OMTMC contains a pointer to an OMTUC for the first nonglobal UOW Instance. Each OMTUC 2204 contains a pointer to the next OMTUC as well as a pointer to the first OMTIC 2206 within the OMTUC. The OMTUCs 2204 are maintained in a List of other Units of Work, separate from the Global UOW 2212. Each OMTIC contains a pointer to the first OMTFC 2208 within the OMTIC as well as a pointer to the next OMTIC. Finally, the OMTFC contains a pointer to the actual Instance Frame (IF) 2210 and a pointer to the next OMTFC.

The OM can switch to any UOW in the List of Units of Work. Because the Global UOW is not kept in the List, the OM can not switch to the Global UOW. If the Global UOW can not be switched, it can not be current. If the Global UOW is not current is can not be discarded, committed or rolledback.

IF resolution is a process associated with the OMT and UOW to materialize data into memory. When an instance object is called the OM will look into the Current UOW and into the Global UOW to locate an entry with a matching object id for the instance being called. If this search scope does not resolve the matching object, and if it is a persistent object, then a frame will be allocated in memory to hold the persistent data. This new object will be called to materialize its data from the database. The present OOPS thus automatically materializes objects using what is called automaterialization.

Object references may be either resolved or unresolved. As noted above, the object reference comprises the object id which identifies the object. The object reference also comprises an access address. The access address is set to point to the correct entry in the OMT the first time the object is resolved. Once an object reference is resolved, no further searching for the object id is needed.

For an unresolved object reference, the access address is set to point to the correct entry in the OMT. Once it is resolved, the OM must make sure that the entry matches the correct object attribute, and make sure that it is in either the Current or Global UOW.

If a message is sent using a resolved object reference that already points to an entry, but the entry is in a non-Current UOW (i.e., not in Current and not in Global), a visitor object must be created. A copy of the object is made in the Current UOW and then the message is sent to the copy of the object, rather than to the original object. Thus, during the resolve process persistent objects are found and materialized and visitor objects are created.

A UOW Class is a interface to control the UOW environment. A UOW Class has several methods to perform different UOW operations. A NEW method is invoked to create a New UOW and to place the New UOW on the end of the List of UOW. The new UOW becomes the Current UOW.

A START method is used to increment the UOW level. A COMMIT method is used to decrement the UOW level and copy all instances at the Current UOW level down to the previous UOW level, saving all changes. Hence, access to the database is controlled by using commit calls to save changes, and instance resolution to materialize data into memory.

A ROLLBACK method may be called to throw away all instances (instance changes) at the Current UOW level. A DISCARD method is used to throw away the entire UOW and all instances at all levels. A SWITCH permits switching to any other UOW instance, except the Global UOW. START, COMMIT, ROLLBACK, and DISCARD only operate on the Current UOW.

All instance objects inherit five methods. CREATE is a method that creates a new instance and places it into either the Current UOW or the Global UOW. The Global object is an class attribute that controls where the new instance is placed. A "true" condition indicates that the new instance is placed in the Global UOW, otherwise it is placed in the Current UOW.

A method titled ALLOCATE allocates additional space for the VA. In other words the frame is resized using an ALLOCATE call.

A DELETE method permits an object to be marked for deletion. If the object is currently residing the Global UOW it will be immediately deleted upon the invocation of a DELETE call. If the receiving object is in another UOW it would simply be marked for deletion, and will later be deleted at UOW commit time.

A NOTIFY method is used to announce that changes to an object are eminent, thus a copy of the object is verified at the Current UOW level. NOTIFY makes sure that all changes are performed only at the Current UOW level so that they can be ROLLEDBACK if desired.

Finally, a MOVE_TO_GLOBAL_UOW method will move the frame from any UOW to the Global UOW to facilitate Global accessibility of the frame.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

We claim:

1. A system for implementing a messenger and object manager in an object oriented programming environment on a data processor containing a memory, in which a plurality of objects are categorized into one or more classes which define functions of the objects categorized therein, and in which messages are sent by the data processor to at least one object to perform at least one action upon the object, said system comprising:
   (a) an object management table for storing class data, default instance data and instance object data;
   (b) a loaded classes table for storing functions of objects belonging to classes that are loaded in the data processor;
   (c) message call processing means operating on the data processor for processing a message call to an instance, wherein said message call requests an action to be performed on said instance according to a function of said instance, said message call processing means, including:
      (1) data resolution means for calling said object management table to resolve:
         (i) class data and default instance data corresponding to said instance if said instance is a class object; and
         (ii) class data and instance object data corresponding to said instance if said instance is an instance object; and
      (2) function resolution means for calling said loaded classes table to determine whether a class corresponding to said function of said instance is loaded, and for dynamically loading said corresponding class if it is not loaded.

2. The system according to claim 1, wherein said message call processing means determines class and instance data offsets upon entry into function stored in said loaded classes table.

3. The system according to claim 2, wherein said class and instance data offsets are:
   (i) both null if said function is implemented locally; or
   (ii) selected from an ancestor list if said function is implemented by an ancestor.

4. The system according to claim 1, wherein said system further comprises:
   (4) an ancestor list that identifies for each class all corresponding ancestor classes; and
   (5) a feature table that identifies each function available in each class and whether each function is implemented in a specific ancestor class; and
   wherein said object management table comprises means for administering an indirection pointer to a location in the memory for each action specified by said message call.

5. The system according to claim 1, further comprising a security table which indicates whether security should be checked for each function invoked.

6. The system according to claim 1, wherein said class data and default instance data is resolved by getting indirection pointers from said object management table, wherein said indiscretion pointers point to addresses of data frames corresponding to said class object.

7. The system according to claim 1, wherein said class data and instance object data is resolved by getting indirection pointers from said object management table, wherein said indirection pointers point to addresses of data frames corresponding to sad instance object.

8. A method for implementing a messenger and object manager in an object oriented programming environment on a data processor containing a memory, in which a plurality of objects are categorized into one or more classes which define functions of the objects categorized therein, and in which messages are sent by the data processor to at least one object to perform at least one action upon the object, said method comprising the processor executed steps of:
   (1) storing class data, default instance data and instance object data in an object management table;
   (2) storing functions of objects belonging to classes that are loaded in the data processor in a loaded classes table;
   (3) processing a message call to an instance utilizing a message call processing means operating on the data processor, wherein said message call requests an action be to performed on said instance according to a function of said instance, said processing further comprising the steps of:
      (a) calling said object management table to resolve:
         (i) class data and default instance data corresponding to said instance if said instance is a class object; and
         (ii) class data and instance object data corresponding to sad instance if said instance is an instance object; and
      (b) calling said loaded classes table to determine whether a class corresponding to said function of said instance is loaded; and then
      (c) dynamically loading said corresponding class if it is not loaded.

9. The method according to claim 8, wherein said processing further comprises the steps of:

(4) defining an ancestor list that identifies for each class all corresponding ancestor classes;

(5) defining a feature table that identifies each function available in each class and whether each function is inherited from a specific ancestor class; and then (6) administering an indirection pointer to a location in the memory for each action specified by said message call.

10. The method according to claim 8, further comprising the step of checking a security table to determine whether security should be checked for each function invoked.

11. The method according to claim 8, further comprising the step of getting indirection pointers from said object management table to resolve said class data and default instance data, wherein said indirection pointers point to addresses of data frames corresponding to said class object.

12. The method according to claim 8, further comprising the step of getting indirection pointers from said object management table to resolve said class data and instance object data, wherein said indirection pointers point to addresses of data frames corresponding to said instance object.

* * * * *